Nov. 8, 1932.  F. D. WINKLEY  1,886,457
TRANSPLANTING MACHINE
Filed April 20, 1928   3 Sheets-Sheet 1

Nov. 8, 1932.  F. D. WINKLEY  1,886,457
TRANSPLANTING MACHINE
Filed April 20, 1928   3 Sheets-Sheet 2

Inventor
Frank D. Winkley

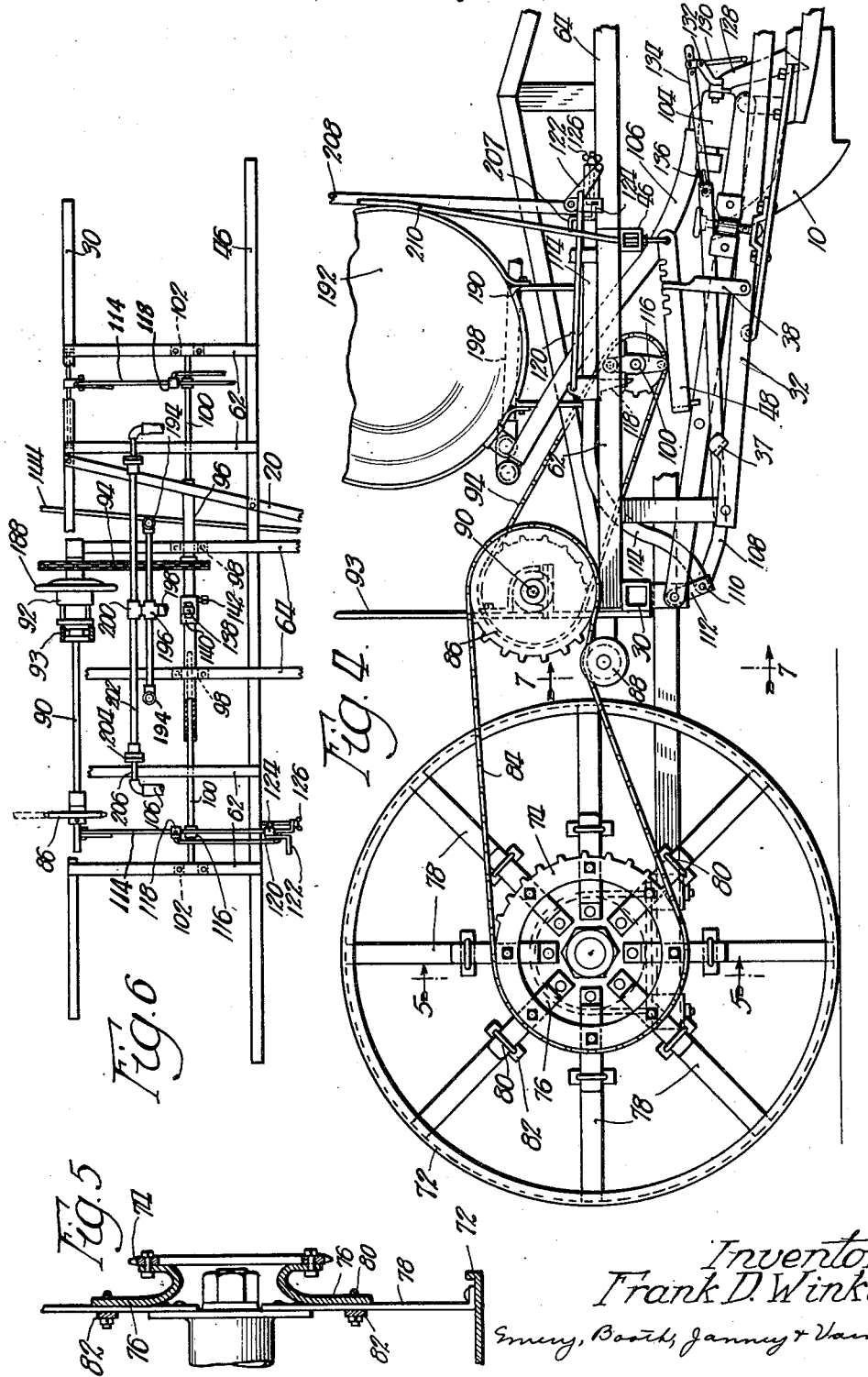

Patented Nov. 8, 1932

1,886,457

UNITED STATES PATENT OFFICE

FRANK D. WINKLEY, OF MADISON, WISCONSIN

TRANSPLANTING MACHINE

Application filed April 20, 1928. Serial No. 271,482.

My invention relates to agriculture and includes among its objects and advantages the provision of improved means for transplanting seedlings. In the accompanying drawings:

Fig. 4 is a partial side elevation of the complete machine showing the parts omitted from the transplanting unit in Fig. 3;

Fig. 5 is a section on line 5—5 of Fig. 4;

Fig. 6 is a fragmentary plan view of the transmission for timing and water control;

Figure 1:
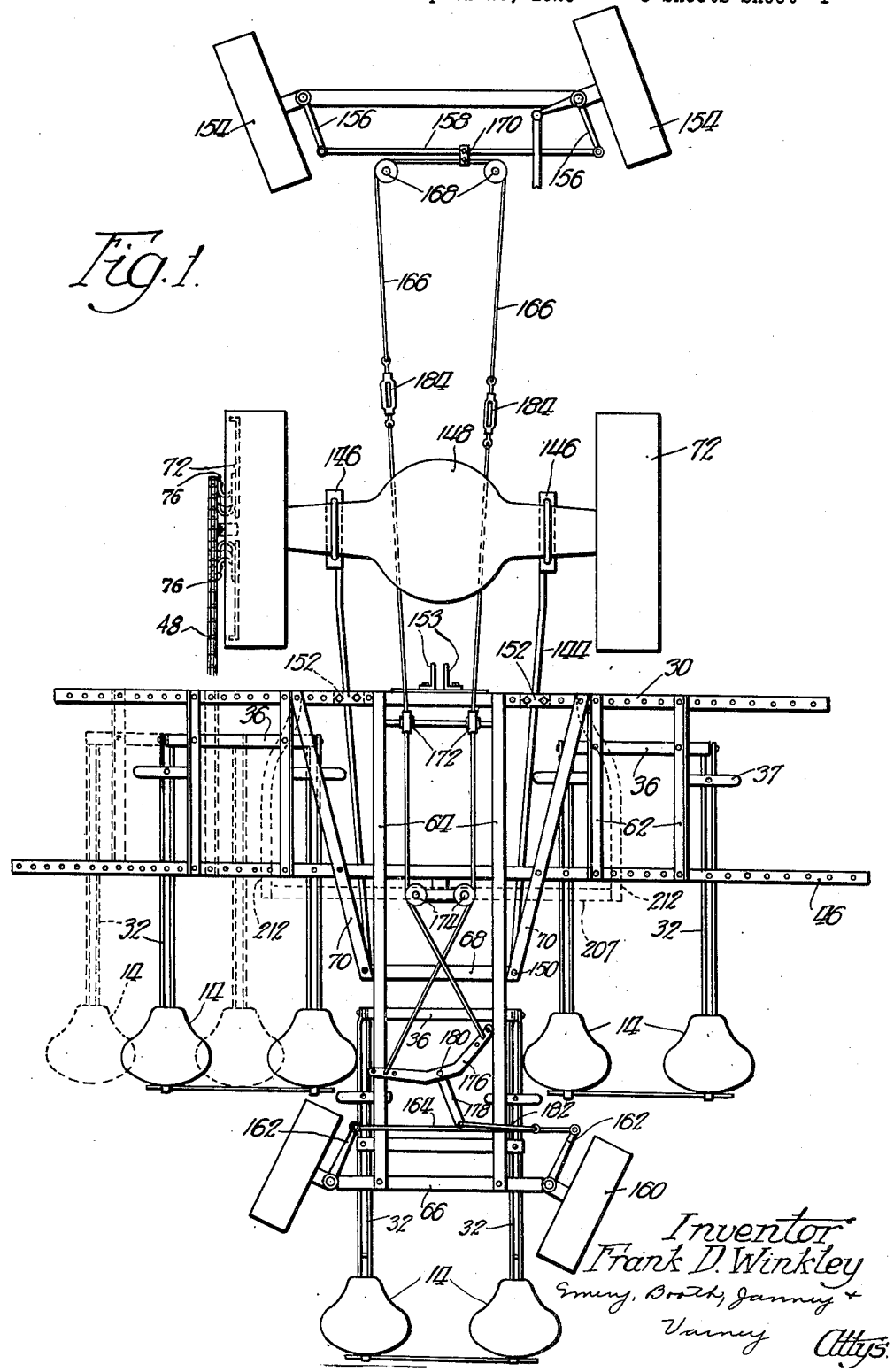
Fig. 1 is a more or less diagrammatic plan view of an apparatus according to the invention.

In the embodiment of apparatus according to the invention selected for illustration, a plurality of transplanting units are mounted on a frame in such a way as to be capable of relative adjustment to place the seedlings in transverse, as well as longitudinal, alignment across the field over a wide range of different space relationships covering substantially the entire range employed in agricultural work.

The transplanting unit

Each transplanting unit comprises earth engaging elements 10 and 12. The elements 10 plow a groove in the soil, and the elements 12 throw the material displaced laterally by the elements 10 back to fill the groove. As the parts move along, one or more operators on the seats 14 may drop or place seedlings in the groove just before the elements 12 fill it up again, and thus the planting operation is performed.

The earth engaging elements are pivoted at 16 at the rear end of an arm 18 extending forwardly and upwardly to a pivot at 20 on the frame. To vary the relative depths to which the elements 10 and 12 engage or penetrate the soil, they may be rocked around the pivot 16 by suitable set screw means such as 22. This changes the extent to which the material displaced by the elements 10 is replaced by the elements 12, so that the row of seedlings may be left in the center of a slight trough or a slight ridge, or occupying a substantially level space.

Figure 7:
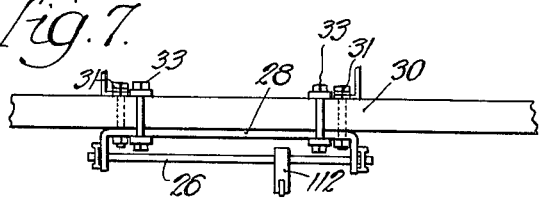
Fig. 7 is a fragmentary detail on line 7—7 of Fig. 4.

Means are provided, actuated by the weight of the operators on the seats 14, for pressing the elements 10 and 12 into the soil. I have illustrated adjustable connections for this purpose. The arm 18 is made up of rods running substantially parallel up to the rivet 24 and then diverging out over the ends of a long pintle 26, (see Fig. 7). For each side unit, the pintle is supported by a clip 28 bolted on the front cross-piece 30, by bolts 31. To keep the clip from falling when the bolts are removed to shift the clip, I have shown a pair of loops 33. The operators' seats 14 are on the rear ends of arms 32 pivoted somewhat lower and somewhat farther back on pivots at 34 at the lower ends of the downwardly extending arms of a U-shaped brace 36. The operator's feet are supported by a foot rest 37 on the arm 32. The weight of each operator is carried up by a clevis 38, the bight of which may take into any one of a plurality of notches 40 in a lever 42. The rear ends of the levers 42 are pivotally supported by eye-bolts 44 from a rear cross-bar 46. The levers 42 are united by a reach or bight 48 into a single U-shaped yoke riding at 50 on the arm 18. It will be apparent that the weight of the operator is increased by the leverage on the clevis 38, but decreased by the leverage on the point 50 and again decreased by the leverage on the arm 18 from the point 50 to the earth engaging elements. As the last decrease is in about the same ratio as the first increase, it will be evident that, in the particular device illustrated, from about one-sixth to nearly one-half of the weight of each operator will be transmitted through the system of levers to the earth engaging elements, depending on the notch 40 selected to receive the bight of the clevis 38.

When it is desired to move the device with the elements 10 and 12 clear of the ground, they may be lifted by depressing the hand lever 52. This will operate in tension through the bolt 54 and the plunger 56, guided in a socket 57 formed in the arm 18 and connected to the front ends of the plates 58 rigid with the elements 10 and 12. When the weight of the operators is not sufficient for satisfactory work, that weight may be somewhat augment by moving the lever 52 to its extreme uppermost position. This will compress the spring 60.

*The frame*

Figure 2:
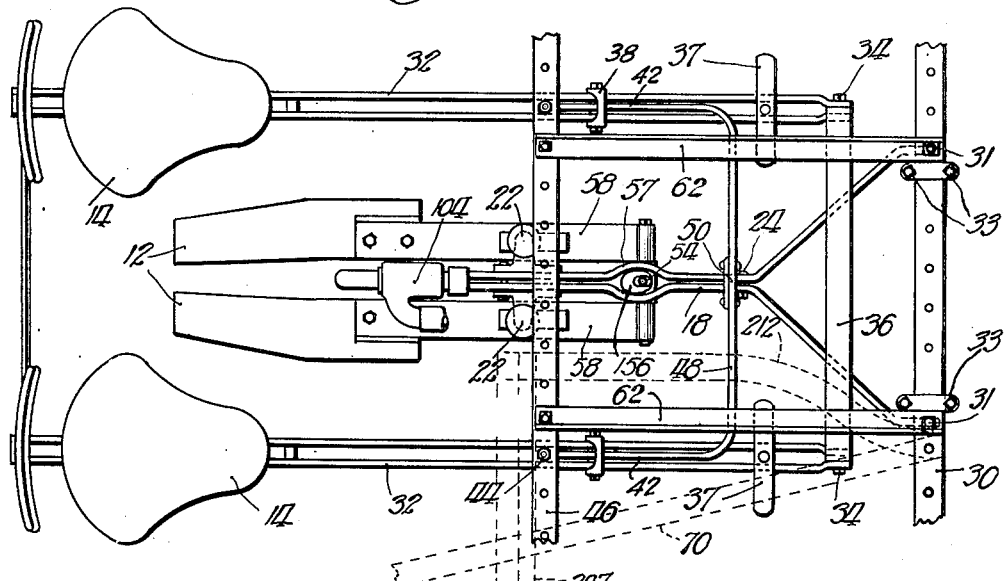
Fig. 2 is a plan view of a transplanting unit.
Figure 3:
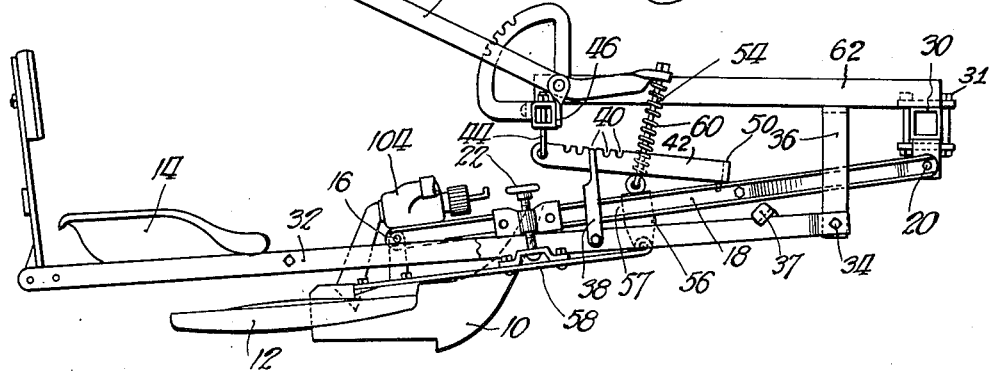
Fig. 3 is a side elevation of the same unit with some of the timing and water control mechanism omitted for purposes of clearness.

To treble the rate of transplanting, a single tractor draws three such transplanting units as are illustrated in Figures 2 and 3, for the simultaneous planting of three rows.

Referring to Fig. 1, the cross-bars 30 and 46 are located near the front of a T-shaped frame, and extend laterally from both sides thereof. The yokes 36 for the side units are supported on short longitudinal braces 62 adjustably bolted in place on the cross-pieces 30 and 44. The cross-pieces 30 and 46 are each provided with a series of apertures for receiving the bolts. Thus by disconnecting the bolts for the braces 62, removing the eye-bolts 44 and loosening the clamps for the clip 28, the entire unit illustrated in Figures 2 and 3 can be slid transversely as indicated in dotted lines at the left side of Fig. 1. This adjustment permits the operator to set the different units for any desired distance between rows over a wide range. In the embodiment shown, the widest spacing obtainable for three rows is only slightly less than the narrowest spacing obtainable when only the side units are employed.

The longitudinal portion of the frame comprises beams 64 running rearwardly on either side of the center line to the rear axle 66. The whole structure may be braced and strengthend by an additional cross-brace 68.

The central transplanting unit needs no transverse adjustment. Its central arm 18 may be pivoted below the cross-brace 68, and the yoke 36, carrying the front ends of the arms 32 for the seats, may be fastened directly to the longitudinal beams 64. The mounting shown positions the central unit en echelon with respect to each of the side units, but the side units are offset longitudinally in the same direction with respect to the central unit, so that they are abreast rather than en echelon with respect to each other.

*Transmission and synchronizing*

In a great many transplanting operations it is necessary to pour a considerable charge of water into the trough at the point where the plant is placed. It is also desirable in most instances to have the plants in adjacent rows in alignment transversely of the field so that cultivators can travel across the field transversely as well as longitudinally. I have illustrated means associated with each transplanting unit for periodically discharging a charge of water; adjustable synchronizing means, for varying the timing of the charge delivered by the central transplanting unit with respect to the charges delivered by side units; a power transmission for connection to a tractor used to draw the device, for actuating the synchronized timing and water discharge means for all three transplanting units; and means controlled by the operator of a tractor used to draw the device, for making a simultaneous adjustment of the timing of all three planting devices to get one set of three rows into transverse alignment with preceding rows.

Referring now to Figures 4, 5 and 6, the left rear drive wheel 72 of the tractor used to draw the device is provided with a drive sprocket 74. This sprocket may be removably clamped in place by a plurality of radial arms 76 bolted to the sprocket and registering with the spokes 78 of the wheel 72. The end of each arm may be clamped to its spoke by a U-bolt 80 and clamping plate 82. I have found that this provides an entirely satisfactory mounting for such a transmission as that disclosed. The arms extending in a vertical plane assure a positioning of the sprocket in the same vertical plane as the axis of the wheel, and the arms extending in the horizontal plane complete the alignment.

The chain 84 extends back to a pinion 86 and may be suitably tensioned by an idler roll 88. The pinion 86 drives an intermediate transmission shaft 90 connected through a clutch indicated at 92, (see Fig. 6), and a second chain 94, with a central cam shaft 96. The clutch may be shifted into either operative or inoperative positions by any preferred type of control means, such as the hand lever 93, accessible to the driver of the tractor, and provided with latch means (not shown) for holding the clutch disengaged. The central cam shaft 96 is mounted in bearings 98 on the longitudinal beams 64 and has splined relation with side cam shafts 100 having their outer ends journalled in outboard bearings 102, supported by the outermost of the longitudinal braces 62.

Referring now to Figure 4, each of the side transplanting units carries a water valve 104 connected by a flexible tube 106 with a source of supply to be described later. This valve may be pulled open by a drag link 108 pivoted at 110 to a short rocker arm 112 on the pintle 26. An actuating arm 114 engages the same pivot 110 and extends upwardly and rearwardly over the cam 116. A shoe 118 carried by the arm 114 lies beside the cam in a position to be periodically pushed forward by it to actuate the linkage and discharge a charge of water.

Means are provided for rendering the water discharge inoperative at the will of the operator. The shoe 118 is slidable on the arm 114 and its position on the arm is controlled by a link 120 connected to an intermediate point on a short lever 122. By throwing the lever 122 in a counter-clockwise direction over to the left in Figure 4, the shoe 118 will be moved forward out of the way of the cam so that no discharge of water will occur. To adjust the amount of opening of the valve when the parts are in the position shown in Figure 4, the lever 122 is itself mounted on a slidable shoe 124 adjustable longitudinally on the arm 114 by means of a bolt and wing nut 126.

The transmission from the central cam to the water valve of the central transplanting device is identical except that the upper reach of arm 114 and the positioning link 120 must be elongated to extend back where the operators can reach them, and the drag link 108 must be elongated to reach back to the valve.

The charge of water released by the valve 104 is discharged through a nozzle 128 directly into the trench.

Means are provided for assisting the operator in moving his hand so as to deposit the plant in the trench at just the proper position. A spacer 130 is shown at the right hand in Figure 4 pivoted at 132 and rotatable in a counter-clockwise direction by means of a drag link 134. This link has a pin and slot connection at 136 with the rear end of the drag link 108. At the extreme limit of the forward movement of the drag link 108 when the water discharge through the valve is a maximum, the spacer will swing back and provide mechanical guidance for the operator in placing the seedling.

The rear sprocket for the drive chain 84 and both sprockets for the drive chain 94 are readily replaceable to provide a wide range of speeds for the cam shafts to vary the spacing of the different seedlings in the same row.

It will be apparent that the relative positioning of the central timing cam 138 compared with the side cams 116 must be such that the operators on the central unit will plant in transverse alignment with the plants previously set by the operators on the side units. In other words, the central cam must be behind the side cams by an amount corresponding to the distance by which the central unit is set behind the side units. Whenever the speed of rotation of the cam shaft is changed, the relative angular positions of the central and side cams must be readjusted. For that reason the cam 138 is mounted on a sleeve 140 provided with a set screw 142 for fastening it in any adjusted position on the shaft 96.

To make the adjustment, after the desired speed ratio for the cam shaft has been secured, the operator of the tractor can move the device over the ground while the operators of the side units plant one seedling each. The forward movement is then continued until the rear unit is in position to make a planting in transverse alignment with the seedlings set by the side units. The cam 138 is now moved to the position of initial contact with its shoe 118 and the adjustment is completed.

The tractor hitch

To keep the planting units always in line with the axis of the tractor, I provide a pair of draw-bars 144 and means 146 for clamping the front ends of these draw-bars on the rear axle 148 of the tractor. The draw-bars are pivoted at their rear ends at 150 and may be adjustably bolted at 152 to the front cross-bar 30 so that they can be shifted to accommodate different sizes of tractor.

To eliminate sidewise shifting, I provide a vertical slot at 153 between angles bolted on the front of the front cross-bar 30. These may be adjustably mounted to receive the draw-bar plate of the tractor. The vertical slot permits a slight relative vertical movement between the parts at this point so that the entire unit can negotiate irregular ground without binding.

The front wheels 154 of the tractor are carried on the usual knuckles 156 and connected by the usual drag link 158. I support the rear and only axle 66 of the transplanting device on similar wheels 160 and knuckles 162 connected by the drag link 164. To relieve the connections at the front of undue strain and to insure proper tracking when turning around or backing up, I interconnect drag links 158 and 164. I have illustrated a cable 166 running over fixed pulleys 168 mounted on the body of the tractor and having the reach between the pulleys 168 connected by a clip 170 to the drag link 158. The cables then run rearwardly over a first set of guide pulleys 172 and a second set of guide pulleys 174. They are then crossed and connected to the ends of arms 176 integral with a tiller 178 and pivoted at 180. A connection through a link 182 between the tiller 178 and the drag link 164 completes the transmission. The cables may be suitably tensioned and the front and rear steering wheels of the combined unit correctly aligned, by means of turnbuckles 184, one in each of the longest longitudinal reach on each side of the clip 170.

It will be apparent that the operator of the tractor has the same identical control over the wheels 160 as he has over the wheels 154, and that the entire six-wheel unit may be steered and maneuvered while going either forward or backward and turning curves headed in either direction.

The rows

In operation the unit is driven straight across the field to plant three rows and as close as may be to the extreme end or edge of the area to be planted. The clutch 92 is thrown out, and all the planting units are lifted out of the soil. It is now possible to back up a little and turn around to start back parallel to the rows last planted. In doing this the operator of the tractor can back and fill until he is laterally spaced a correct distance from the last rows planted and in perfect alignment for the next trip across the field. He now backs up until the side operators on the transplanting unit next the rows previously planted tell him they are in transverse alignment with the seedlings in previous rows, and lower their units ready for planting. The clutch 92 includes a hand wheel 188 on the driven side. The operator of the tractor will now turn the cam shaft by means of this hand wheel until the side cams 116 are in position to start the discharge of water for the side units. The clutch 92 is then thrown in, the signal given, and the entire outfit starts across the field at full speed in perfect alignment with previous plantings.

The water supply

Above the frame I provide a tank support 190 of suitable proportions for carrying one or more tanks 192. I prefer to employ two such tanks, one on each side of the center line of the machine with outlet connections at 194 (see Fig. 6), running to a central cross 196. From the cross 196 a conduit 198 runs back along the center line to the rear transplanting unit. A T 200 affords communication with side pipes 202. Each side pipe 202 connects slidably through a gland 204 with a receiving pipe 206 carried by one of the side units and connected to the flexible tube 106 thereof.

As the weights that must be carried on the ends of the cross-pieces 30 and 46 are quite heavy, it is desirable to brace the structure, especially in the vertical plane of the cross-piece 46. I have illustrated a Z-bar 207 laid across over the frame members 64 and 70 and extending out laterally farther than the front ends of the members 70, as indicated in dotted lines in Figures 1 and 2. Vertical struts 208 are mounted at the ends of the Z-bar and their tops are connected together and to the ends of the cross-bar 46 by tension rods 210.

By locating the struts 208 in the positions indicated, it is possible to run a brace 212 from the front end of each frame member 70 outwardly and rearwardly to the end of the Z-bar 207. This brace supports the weight of the outer end of the water tank, leaving a clearance below to permit the side planting unit to slide in under the end of the tank.

Without further elaboration, the foregoing will so fully explain the gist of my invention, that others may, by applying current knowledge, readily adapt the same for use under various conditions of service. It will be obvious that all the novel features described need not necessarily be employed in conjunction as they may advantageously be utilized in various combinations and sub-combinations.

What I claim is:

1. Transplanting equipment including three transplanting units arranged in echelon relationship with the center unit behind the other two; timing and timed water discharge mechanism for each unit; a transmission for driving the mechanism for all the units; said transmission including adjustable means for varying the longitudinal spacing of the seedlings, and adjustable means for compensating for the echelon arrangement to cause all the units to be used to deposit the plants in transverse alignment.

2. Transplanting equipment including three transplanting units arranged in echelon relationship with the center unit behind the other two; a frame for said units; timed water discharge mechanism for each unit; and means for varying the timing of the central unit with respect to that of the side units.

3. Transplanting equipment including a plurality of transplanting units, each adapted to carry two operators, said units being arranged in echelon relationship.

4. Transplanting equipment including a plurality of transplanting units arranged in echelon relationship and timing mechanism for said units; said timing mechanism including means compensating for the echelon arrangement to time all the units to time the deposit of the plants in transverse alignment.

5. Transplanting equipment including a plurality of transplanting units arranged in longitudinally echelon relationship; a frame for said units; lateral adjustment means for all but one of said units for varying the spacing between rows; timing and timed water discharge mechanism for each unit; adjustable means for varying the longitudinal spacing of the seedlings, and adjustable means for compensating for the echelon arrangement to cause all the units to time the deposit of the plants in transverse alignment.

6. Transplanting equipment including three transplanting units arranged in echelon relationship; a frame for said units; a weight-carrying tractor hitch at the front end of frame; and weight-carrying wheels behind the side units and straddling the center unit.

7. Transplanting equipment including three transplanting units arranged in echelon relationship for use in planting three adjacent rows of seedlings; a unitary frame for all said units; lateral adjustment means for all but one of said units for varying the spacing between rows; timing, and timed water discharge mechanism for each unit; a transmission for driving the mechanism for all the units from a source of power used to draw the frame; said transmission including adjustable means for varying the longitudinal spacing of the seedlings, and adjustable means for compensating for the echelon arrangement to cause all the units to be used for depositing the plants in transverse alignment; a tractor hitch compelling the frame to keep in longitudinal alignment with a drawing device; steering wheels supporting the frame; and a transmission for connecting said steering wheels with the steering wheels of a drawing device.

8. Transplanting equipment, including a plurality of transplanting units, each unit adapted to carry an operator, said units being arranged in echelon formation; and means for varying the lateral spacing of said units.

In testimony whereof, I have signed my name to this specification.

FRANK D. WINKLEY.